United States Patent
Dally et al.

(10) Patent No.: US 9,685,789 B2
(45) Date of Patent: Jun. 20, 2017

(54) CURRENT DIVERSION FOR POWER-PROVIDING SYSTEMS

(71) Applicant: The Board of Trustees of the Leland Stanford Junior University, Palo Alto, CA (US)

(72) Inventors: William J. Dally, Los Altos Hills, CA (US); Darren Hau, Los Gatos, CA (US); Vivek Choksi, Los Altos Hills, CA (US); Andrew J. Ponec, Salem, OR (US); Christopher Ling, Cupertino, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 543 days.

(21) Appl. No.: 14/209,882

(22) Filed: Mar. 13, 2014

(65) Prior Publication Data

US 2014/0265589 A1 Sep. 18, 2014

Related U.S. Application Data

(60) Provisional application No. 61/781,774, filed on Mar. 14, 2013.

(51) Int. Cl.
*H02J 3/38* (2006.01)
*G05F 1/67* (2006.01)
*H02M 3/335* (2006.01)

(52) U.S. Cl.
CPC .............. *H02J 3/383* (2013.01); *G05F 1/67* (2013.01); *H02J 3/385* (2013.01); *H02M 3/3353* (2013.01);
(Continued)

(58) Field of Classification Search
CPC ............ Y10T 307/609; Y10T 307/685; Y10T 307/691; Y10T 307/707; Y10T 307/352;
(Continued)

(56) References Cited

U.S. PATENT DOCUMENTS

| 4,375,662 A | 3/1983 | Baker |
| 4,404,472 A | 9/1983 | Steigerwald |

(Continued)

OTHER PUBLICATIONS

Chen et al., "A new Maximum power Point Tracking Controller for Photovoltaic Power Generation", IEEE, pp. 58-62, 2003. Abstract Only.

(Continued)

*Primary Examiner* — Ryan Johnson
(74) *Attorney, Agent, or Firm* — Crawford Maunu PLLC

(57) ABSTRACT

Various example embodiments are directed to methods and apparatuses for diverting current from a Photovoltaic (PV) module. In particular embodiments, the PV module can be part of a series connection (or string) of PV modules. The series connection provides a primary current path through which generated current flows. Current diversion circuit(s) can be used in connection with one or more PV modules. The current diversion circuit detects when the current through the primary current path is less than the desired current level for a corresponding PV module (e.g., the maximum power point). In response to this detection, the current diversion circuit can provide an alternate pathway for current from the corresponding PV module. This results in an overall increase in the current from the PV module and a corresponding increase in efficiency.

30 Claims, 7 Drawing Sheets

(52) U.S. Cl.
CPC .............. *Y02E 10/563* (2013.01); *Y02E 10/58* (2013.01); *Y10T 307/609* (2015.04); *Y10T 307/691* (2015.04); *Y10T 307/707* (2015.04)

(58) Field of Classification Search
CPC ........... H02S 50/10; H02J 3/383; H02J 3/385; Y02E 10/563; Y02E 10/50; Y02E 10/58; G05F 1/67
See application file for complete search history.

(56) References Cited

U.S. PATENT DOCUMENTS

| | | | |
|---|---|---|---|
| 5,268,832 A | 12/1993 | Kandatsu | |
| 5,867,011 A | 2/1999 | Jo et al. | |
| 7,248,946 B2 | 7/2007 | Bashaw et al. | |
| 7,709,727 B2 | 5/2010 | Roehrig et al. | |
| 7,952,892 B2 | 5/2011 | Orr | |
| 7,991,511 B2 | 8/2011 | Zhang et al. | |
| 8,093,757 B2 | 1/2012 | Wolfs | |
| 9,270,226 B2 * | 2/2016 | Shenoy | H02S 50/10 |
| 9,285,816 B2 * | 3/2016 | Easwaran | G05F 1/67 |
| 2001/0032664 A1 | 10/2001 | Takehara et al. | |
| 2003/0121514 A1 | 7/2003 | Davenport et al. | |
| 2005/0172995 A1 | 8/2005 | Rohrig et al. | |
| 2006/0290317 A1 | 12/2006 | McNulty et al. | |
| 2008/0147335 A1 | 6/2008 | Adest et al. | |
| 2009/0078300 A1 | 3/2009 | Ang et al. | |
| 2010/0195361 A1 | 8/2010 | Stem | |
| 2010/0219690 A1 * | 9/2010 | Femia | G05F 1/67 307/77 |
| 2011/0036343 A1 | 2/2011 | Kroyzer et al. | |
| 2012/0091800 A1 | 4/2012 | Shenoy et al. | |

OTHER PUBLICATIONS

Al-Amoudi et al., "Real Time Maximum Power Point Tracking For Grid Connected Photovoltaic System", Power Electronics and Variable Speed Drives, Sep. 18-19, pp. 124-128, 2000. Abstract Only.

Kasa et al., "Robust Control for Maximum Power Point Tracking in Photovoltaic Power System", Proceedings of the IEEE Power Conversion Conference, pp. 827-832, Sep. 2002. Abstract Only.

Pan et al., "A Fast Maximum Power Point Tracker for Photovoltaic Power Systems", Proceedings of the IEEE Industrial Electronics Conference, pp. 390-393, Mar. 1999.

Yaoqin et al., "A New Maximum Power Point Tracking Control Scheme for Wind Generation", Proceedings of the IEEE Power System Technology COnference, pp. 144-148, Feb. 2002.

* cited by examiner

CURRENT DIVERSION FOR POWER-PROVIDING SYSTEMS

OVERVIEW

Clean energy technologies can be hampered by their relative energy costs, which are often compared to traditional (fossil- and nuclear-based) energy technologies. A particular type of clean energy is solar energy. One measure of the energy cost for solar energy technologies is to compare the initial capital costs and the maintenance costs to the amount of energy produced. For many solar technologies, the cost of solar energy is primarily in the initial capital investment. The energy cost is then a function of the initial capital investment spread out over the life of the solar energy device. Accordingly, even modest changes to the upfront material costs and/or power efficiency can determine whether or not a technology is economically viable.

A particular type of solar technology relies upon the photovoltaic (PV) effect. The PV effect can be used to convert solar energy into direct electrical current. For instance, a silicon PV cell can be constructed using a PN junction that creates an electric field. When light strikes the PV cell, electrons gain energy and can be accelerated through the electric field. The resulting direct current (DC) can then be used to provide power to an electrical load.

Specific embodiments herein are directed to power providing capacities of a PV cell which are set as a function of various operating parameters that interact in a non-linear manner (sometimes referred to as the "fill factor"). In particular, the efficiency of a PV cell can be improved by carefully controlling the current drawn from the PV cell. For instance, the current to voltage (IV) ratio for a given set of operating conditions can be non-linear function where the maximum power capabilities lie somewhere between open circuit and closed circuit conditions. If too much or too little current is drawn, the overall efficiency can be significantly reduced.

A single PV cell provides relatively small amounts of power at voltages of about 0.5V. Accordingly, large scale energy production relies upon large groups of PV cells that are linked together in a PV module (or PV panel). For example, PV module can include a series connection of 60 or 75 cells with a potential of 30-40V. Multiple PV modules can then be used in combination. Eventually, the combination of multiple PV modules can be linked back into the electrical power grid using DC-to-AC converter circuits (sometimes referred to as "grid-tie inverters" or simply "inverters"). In some instances, the inverter can be configured to control the amount of current drawn (e.g., by adjusting the effective resistance of the DC input from the PV modules). This control can be designed to improve the overall efficiency of the PV modules.

As further discussed in connection with detailed embodiments herein, the PV modules can be arranged as a series connection in which each PV module in the series will have the same current draw. For a variety of reasons, the ideal current draw can be different for each PV module in the series connection. Accordingly, even if an inverter sets a current draw so that the first PV module is optimized, one or more other PV modules can still underperform due to available current/power that is not being utilized.

Moreover, other power generating and providing circuits may exhibit similar characteristics to PV modules. For instance, battery modules can be comprised of multiple battery cells in series and multiple battery modules can be arranged in a series connection. The particular power providing capabilities of the entire battery system can be degraded by one or more underperforming battery modules.

Particular aspects of the present disclosure are directed toward systems and methodologies for accessing unutilized current from PV modules and/or other power providing modules.

FIGURES

Various example embodiments may be more completely understood in consideration of the following detailed description in connection with the accompanying drawings, in which.

Figure 1:
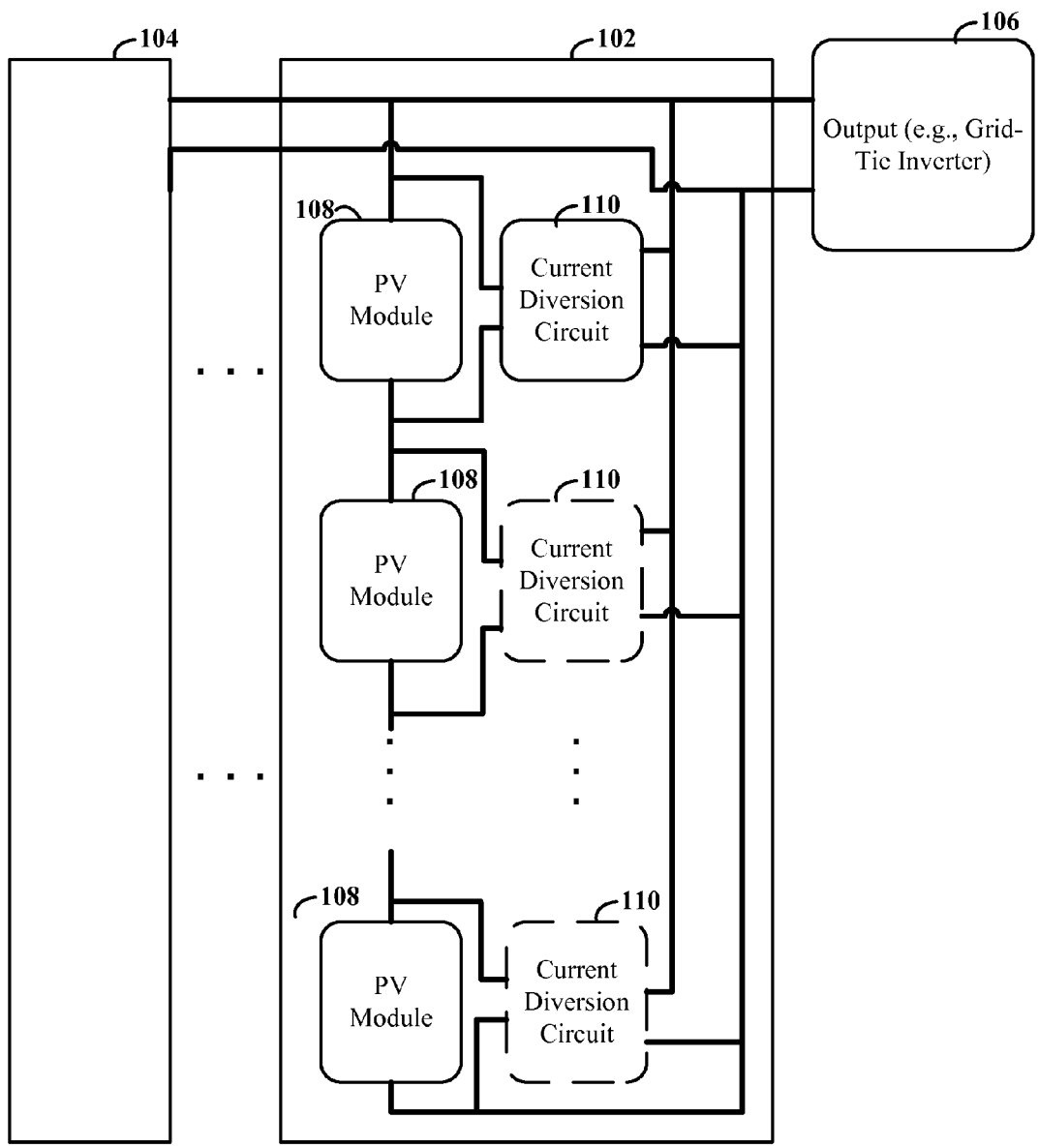
FIG. 1 depicts a block diagram for a PV system configured to divert current from an individual PV module in a string, consistent with embodiments of the present disclosure.

While the disclosure is amenable to various modifications and alternative forms, specifics thereof have been shown by way of example in the drawings and will be described in detail. It should be understood, however, that the disclosure is not limited only to the particular embodiments described. On the contrary, the disclosure is to cover all modifications, equivalents, and alternatives falling within the scope of the disclosure including aspects defined in the claims. In addition, the term "example" as used throughout this application is only by way of illustration, and not limitation.

DESCRIPTION

Aspects of the present disclosure are believed to be applicable to a variety of different types of devices, systems and arrangements involving recovering unused power from one or more power providing modules. While the present disclosure is not necessarily so limited, various aspects of the disclosure may be appreciated through a discussion of examples using this context.

Various example embodiments are directed to methods and apparatuses for diverting current from a power providing modules module. Many of the embodiments discussed herein refer specifically to PV modules; however, it is recognized that other types of power generating/providing modules can also benefit from aspects and embodiments discussed herein.

In particular embodiments, a PV (or other type of power providing) modules are part of a series connection (or string) of PV modules. The series connection provides a primary current path through which generated current flows. Current diversion circuit(s) can be used in connection with one or more PV modules. The current diversion circuit detects when the current through the primary current path is less than the desired current level for a corresponding PV module (e.g., the maximum power point). In response to this detection, the current diversion circuit can provide an alternate pathway for the current from the corresponding PV module. This results in an overall increase in the current from the PV module and a corresponding increase in efficiency.

Consistent with embodiments, current diverted by a current diversion circuit can be provided to the output load for the PV module such that the total output current includes current from both the primary current path and any alternate/secondary current paths. The voltage across the series connection of PV modules is the sum of the individual voltages across each PV module in the series connection. Accordingly, the current diversion circuit can be configured and arranged to function as a DC-to-DC converter to boost the voltage from the voltage of a single PV module and the voltage for the series connection.

Some embodiments contemplate the use of an adjustable load for the string of PV modules. For instance, a grid-tie inverter can be configured to optimize the power efficiency of the entire series connection by adjusting the amount of current drawn by the entire string. Power can also be delivered a DC load, such as a battery. Accordingly, it is recognized that embodiments that mention specific types of output loads and inverters are not necessarily limited thereto.

Aspects of the present disclosure recognize that voltage conversion circuits, whether DC-to-DC, DC-to-AC or otherwise, will exhibit power loss. Moreover, economies of scale flow from the use of many PV modules linked to a single inverter. The single inverter can be designed with high power efficiency in mind because it operates at a higher input voltage and also because the increased cost (e.g., due to higher quality components) is associated with a significant amount of power, which would otherwise be lost by the single inverter, thus taking advantages of economies of scale. The current diversion circuit, however, is associated with less overall power (e.g., the unused current (power) of a corresponding PV module). Moreover, a system can include many current diversion circuits for every inverter. Accordingly, the cost benefit of increasing the efficiency of the current diversion circuit(s) is shifted toward lower cost and efficiency. Based upon recognition of these and other factors, aspects of the present disclosure are directed toward systems and methods that favor current through the primary current path over current through secondary current path(s). In this manner, the system can limit the amount of power lost through the current diversion circuits, while still diverting excess current potential that would otherwise remain unused.

Turning now to the figures, FIG. 1 depicts a block diagram for a PV system configured to divert current from an individual PV module in a string, consistent with embodiments of the present disclosure. The system can include one or more strings 102, 104 of PV modules 108. Power generated by the PV modules 108 can be provided to output 106. In a non-limiting example, output 106 can be a grid-tie inverter designed to provide energy to the electrical power grid. Under ideal conditions, e.g., where all PV modules 108 have identical operating conditions, all power provided to the output 106 can be provided from a primary current path formed by the series connection of PV modules 108. This follows because each PV module 108 would have a maximum power point at the same amount of current.

Embodiments recognize that ideal conditions are not always, if ever, present. For instance, one or more PV modules 108 may be shaded or dirty. Different PV modules 108 may be subject to different temperatures. Moreover, the internal capabilities and structure of the PV modules can differ (e.g., due to age or variations in manufacturing). In certain instances, it is possible that PV modules with different PV cells and/or related technologies could be used in the different PV modules. Accordingly, one or more current diversion circuits 110 allow for different amounts of current to be provided by corresponding PV modules 108, and thereby, decouple the total current provided by a PV module from the amount of current through the primary current path.

Consistent with various embodiments, a PV power generation device can include a plurality of PV modules 108, which are configured and arranged in a series connection to provide a primary current path. There is also a secondary current path circuit, which provides a path to the output 106. The output 106 can therefore be configured and arranged to receive power from both the primary current path and the secondary current path circuit. One or more current-diversion circuits 110 can be configured and arranged to provide an adjustable amount of current from respectively corresponding ones of the plurality PV modules 108 to the secondary current path circuit.

The secondary current path can include wired connections between each current-diversion circuit 110 and the positive and negative output voltage rails for the output 106. Accordingly, the current diversion circuits 110 can be configured and arranged to function as DC-to-DC converters that boost the DC voltage from a single PV module 108 to the string voltage corresponding to the sum of each of PV modules 108 in the series connection.

In certain embodiments, the separate inverter (not shown) can be linked to the output of current diversion circuits 110. Other embodiments are directed toward current diversion circuits 110 that function as DC-to-AC converters and allow for direct connection to the output (e.g., direct connection to the power grid).

FIG. 1 depicts the current diversion devices 110 connected in parallel via the string high and string low buses; however, embodiments are directed toward connecting one or more of the current diversion devices 110 in series. For instance, the output voltages of each of the current diversion devices 110 could be adjusted such that the corresponding output currents are matched.

Figure 2:
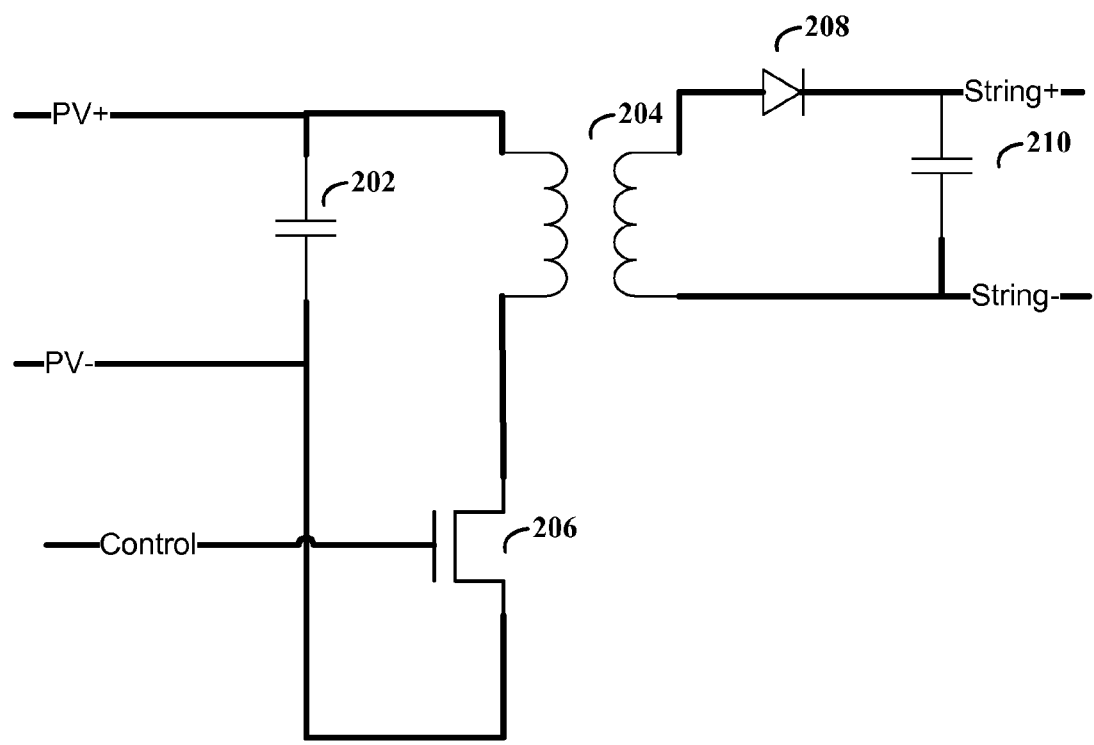
FIG. 2 depicts a circuit diagram for a DC-to-DC converter of a current diversion circuit, consistent with embodiments of the present disclosure.

FIG. 2 depicts a circuit diagram for a DC-to-DC converter of a current diversion circuit, consistent with embodiments of the present disclosure. The circuit depicted in FIG. 2 can function as a converter that can convert a low DC voltage from a single PV module (PV+ and PV−) to a higher DC voltage for the entire string (String+ and String−). Switch 206 controls the activation of the DC-to-DC converter. Capacitor 202 stores current received from the PV module while switch 206 is disabled and can provide current/power when switch 206 is enabled. The magnetizing inductance of transformer 204 stores energy when switch 206 is enabled and releases this stored energy when switch 206 is disabled.

Although not necessarily limited thereto, FIG. 2 depicts component 204 as being a transformer. This can be particularly useful for providing isolation between the input and output of the DC-to-DC converter and is sometimes referred to as a flyback converter. Capacitor 210 stores energy received from inductor 204, and provides the energy to the output (String+ and String−). Diode 208 prevents current and power from flowing back from the output. Embodiments of the present disclosure are directed toward the use of half-bridge flyback converters. Other embodiments contemplated the use of other types of converters, such as flyback converters that use soft switching.

Switch 206 can be controlled using a variety of algorithms and signaling. For instance, pulse width modulation (PWM) and/or pulse frequency modulation (PFM) can be used to adjust the amount of current that is diverted from the corresponding PV module and that is routed to the secondary current path circuit, which includes the connections to output String+ and String−.

Figure 3:
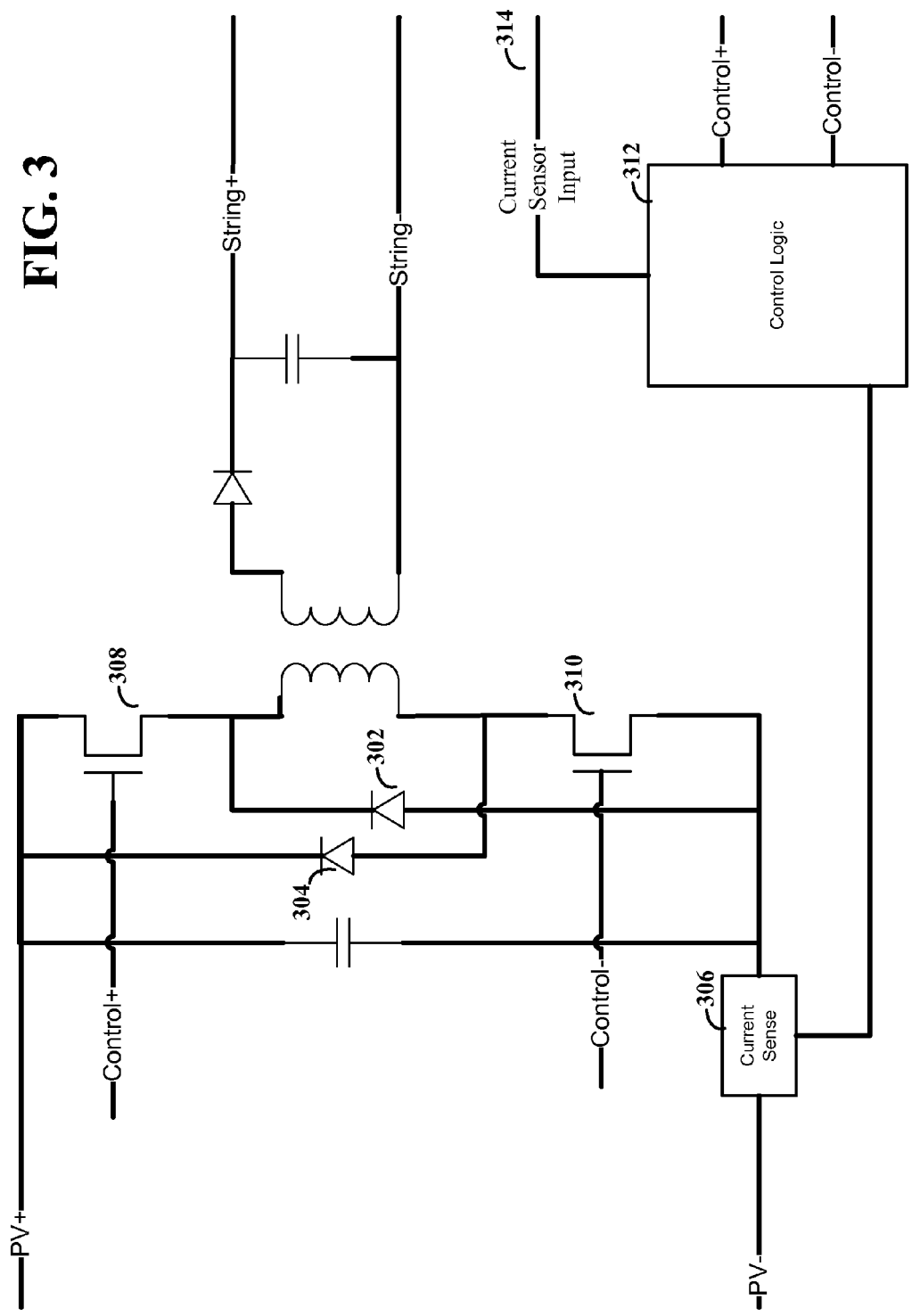
FIG. 3 depicts a circuit diagram for a DC-to-DC converter with energy recovery circuitry, consistent with embodiments of the present disclosure.

FIG. 3 depicts a circuit diagram for a DC-to-DC converter with energy recovery circuitry, consistent with embodiments of the present disclosure. The DC-to-DC converter of FIG. 3 can be operated similar to the flyback converter described in connection with FIG. 2; however, additional energy recover circuitry can improve the efficiency of the overall system. When the converter is enabled, both switches 308 and 310 are enabled and current is allowed to flow through the transformer primary. When the converter is disabled, both switches 308 and 310 are disabled. Diodes 302 and 304 provide a path for the recovery of energy stored in the leakage inductance of the transformer.

FIG. 3 also depicts control logic 312, which can be configured and arranged to adjust the amount of current diverted from the PV module through the application of the control signals (Control+ and Control−). For instance, control logic 312 can use a PWM signal and adjust the duty cycle in order to adjust the amount of current drawn. Control logic 312 can be configured and arranged to determine the desired amount of current based upon one or more detected parameters. Although not limited thereto, one method of determining the desired amount of current measures the power through the PV module. This can be accomplished, for instance, using a measurement of the total current through the panel (diverted current plus string current) (e.g., using current sensor input 314) and the current through the secondary path (e.g., using current sensor 306). The total current can then be multiplied by a measurement of the voltage across the PV module to determine the current amount of power being provided.

There are a number of different algorithms and methodologies that can be used to determine the desired current level from the amount of power that is provided. This can include (but are not necessarily limited to) look up tables based upon predetermined/expected PV module responses or using algorithms that use a search procedure that varies the current levels until a desired amount of current is found or determined. These include, for example, stochastic searches, hill climbing, binary searches and exhaustive searches.

Figure 4:
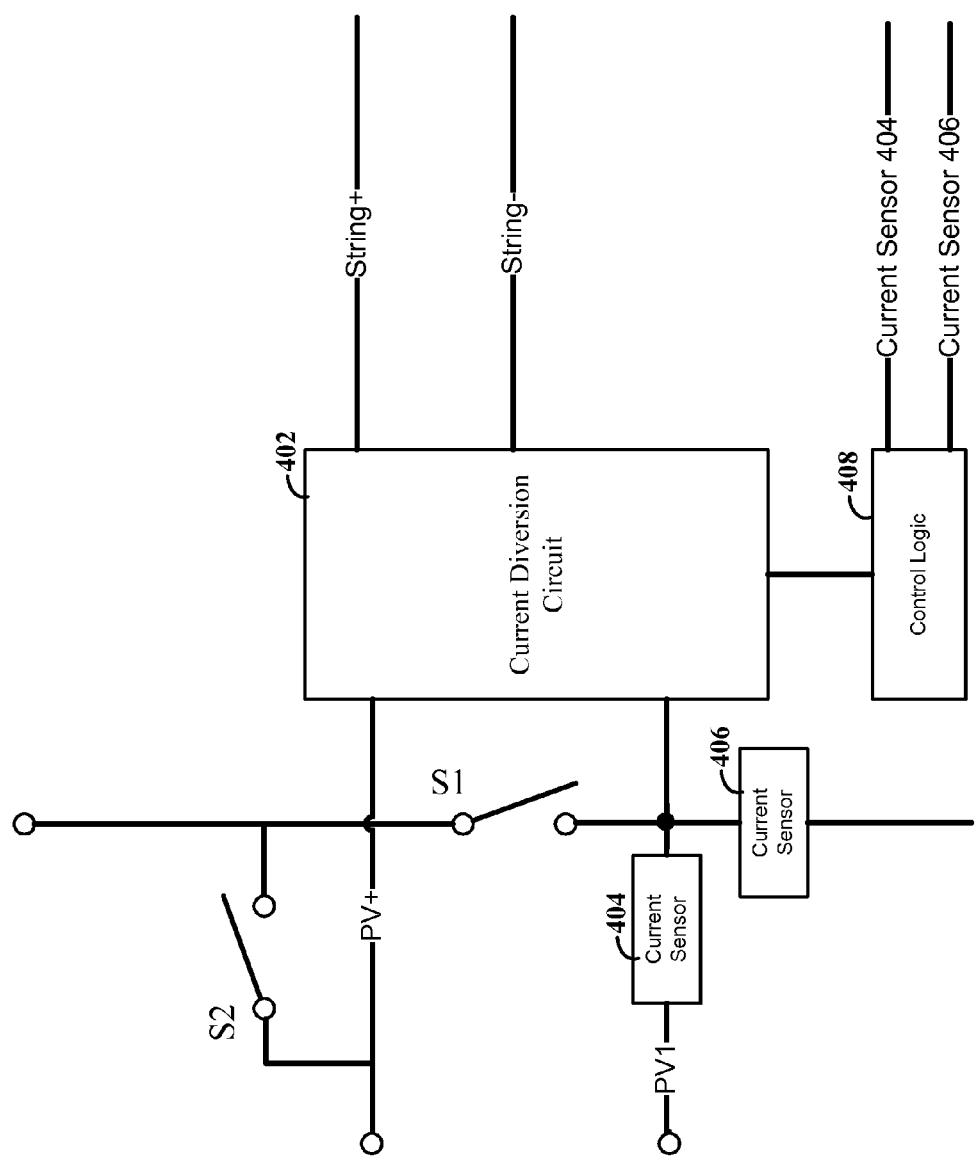
FIG. 4 depicts a circuit diagram for providing a bypass option, consistent with embodiments of the present disclosure.

FIG. 4 depicts a circuit diagram for providing a bypass option, consistent with embodiments of the present disclosure. In some instances, it can be desirable to completely remove (by bypassing) one or more PV modules from the primary current path, such as when the PV module has very little available current. This can occur when the PV module is shaded, dirty, damaged or has other problems. By removing underperforming PV modules, the amount of current through the primary current path can be increased for the remaining PV modules (e.g., the maximum power point tracking for the entire string upon the remaining PV modules). This can be accomplished by disabling switch S2 and enabling switch S1, these switches would be in a reversed configuration when the PV module is to remain in the string.

Aspects of the present disclosure recognize that even underperforming PV modules can still contribute energy. Accordingly, current diversion circuit 402 can extract available current from a PV module that has been bypassed.

Switches S1 and S2 can also both be opened during installation, which can help to protect the devices and improve safety. S1 and S2 can also be opened to shut down the system in case of a hazard (e.g., to prevent fires, etc.). FIG. 4 also depicts two current sensors 404 and 406, one that measures the string current and one that measures the diversion current. The sensed current can be provided to control logic 408, which can modify the operation of current diversion circuit 402. Certain embodiments are also directed toward the use of a current sensor to detect the diverted current from current diversion circuit 402.

Figure 5:
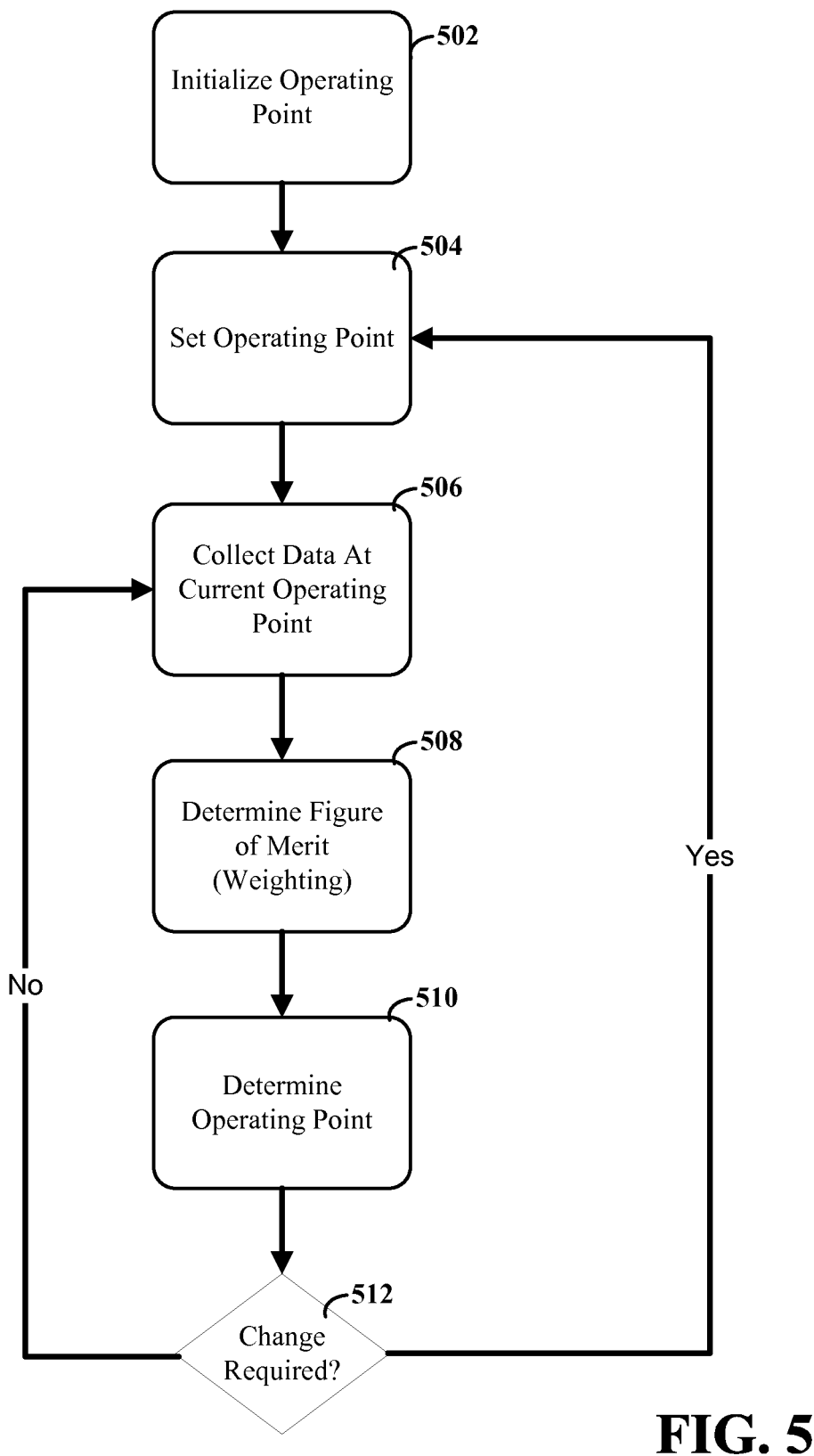
FIG. 5 depicts a flow diagram of an algorithm for determining how much current to divert through a current diversion circuit, consistent with embodiments of the present disclosure.

FIG. 5 depicts a flow diagram of an algorithm for determining how much current to divert through a current diversion circuit, consistent with embodiments of the present disclosure. At block 502, the operating point for the circuit can be set. In one instance, the operating point can be the duty cycle of a PWM control signal. At block 504, the operating point is actually set or implemented in the current diversion circuit. The algorithm can then, optionally, implement a delay to allow the circuit to reach steady state conditions. The relevant parameters can then be collected at block 506. This can include measurements of the voltage and current through the PV module.

Block 508 is directed toward a step in which the collected parameters can be used to determine a figure of merit (FoM). This FoM can be derived from the efficiency of the PV module, but can also involve additional factors and/or more complex calculations. For instance, the FoM can be closely tied to the overall power provided by the PV module, while also including a bias or weighting that gives preference to current provided through the primary current path.

Block 510 determines a new operating point, if necessary, for the circuit. For instance, this determination can be made based upon a comparison of the current FoM to the previous FoM to determine whether or not the FoM is improved. This can indicate, for instance that further adjustments in the same direction can be desirable. This determination can also be made based upon predetermined calculations of desired FoM for the PV module. Certain embodiments are directed toward setting the OP to obtain a voltage that yields the optimal performance from the central inverter. Other embodiments relate to calculating the maxima of the IV curve based on panel characteristics and environmental measurements and setting the OP accordingly.

Block 512 determines whether or not a new operating point is desirable. If a new operating point is desired, the current diversion circuit is adjusted accordingly at block 504. If not, the parameters can continue to be collected at block 506, which can be useful for monitoring for changes in operating conditions.

Figure 6:
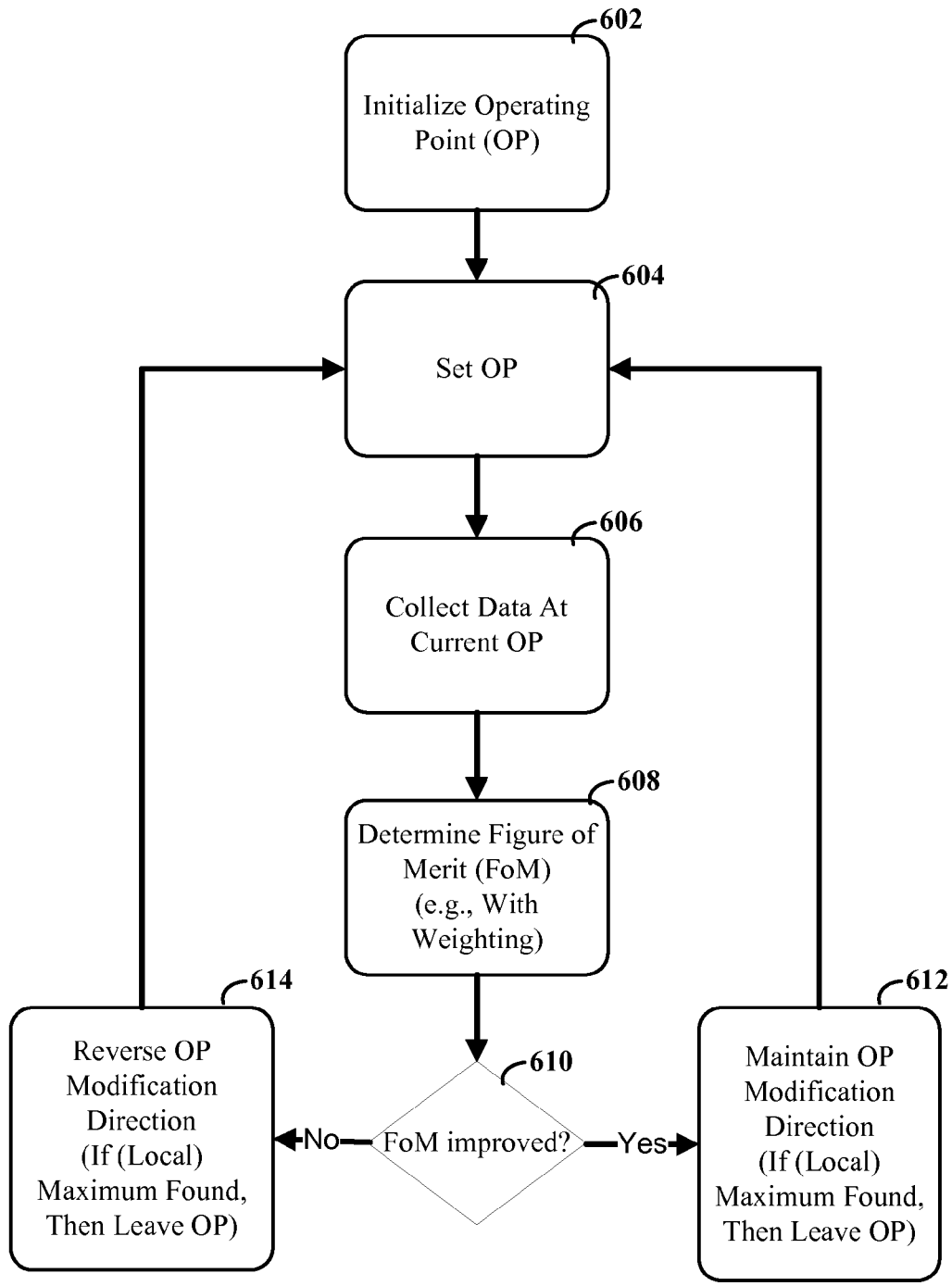
FIG. 6 depicts a flow diagram of a hill climbing algorithm for determining how much current to divert through a current diversion circuit, consistent with embodiments of the present disclosure.

FIG. 6 depicts a flow diagram of a hill climbing algorithm for determining how much current to divert through a current diversion circuit, consistent with embodiments of the present disclosure. The operating point is initialized at block 602. The initial operating point can be selected based upon a number of different techniques. For instance, the operating point can be initialized to a predetermined value, randomly selected or calculated based upon an expected optimal operating point; as an example, this can be based upon predetermined expectations, prior history for the PV module and/or calculated based upon various parameters, such as time of day or measured current. The current diversion circuit is then configured/set according to the operating point, as depicted by block 604. This can include, for instance, setting the duty cycle for a PWM control signal.

At block 606, data can be collected once the current diversion circuit has begun operating at the set operating point. This data collection can include data for measurement of total power provided by the corresponding PV module (e.g., current and voltage measurements). The collected data can then be used to determine an FoM, at block 608. As discussed herein, the FoM can be derived from the total power of the PV module. More particular embodiments provide a weighting or bias that favors power provided through the primary current path over power provided through secondary or alternative current path circuits. This weighting can be set to a value that is sufficient to prevent the system from diverting more current than is desired. For instance, the maximum power point of a PV module relates to the total amount of power/current that is provided. Thus, the maximum power point for a PV module can be achieved independent of the specific ratio of currents through the primary and secondary current paths. However, the overall efficiency of the system can be reduced if too much current is sent through the secondary current path.

The method next involves determining whether or not the FoM was improved, as shown by block 610. If the FoM improved, then the change in the operating point was in a positive direction and the operating point can be modified further in this same direction, as shown by block 612. If the FoM was not improved or worsened, then the method proceeds to block 614, where the operating point can be modified in another (opposite) direction. The method can also (optionally) detect when a (local) maximum point has been reached and stop adjusting the operating point. Thereafter, the method can maintain the operating point until a trigger event occurs. The trigger event can occur periodically, randomly and/or in response to input (e.g., a change in the FoM).

Figure 7:
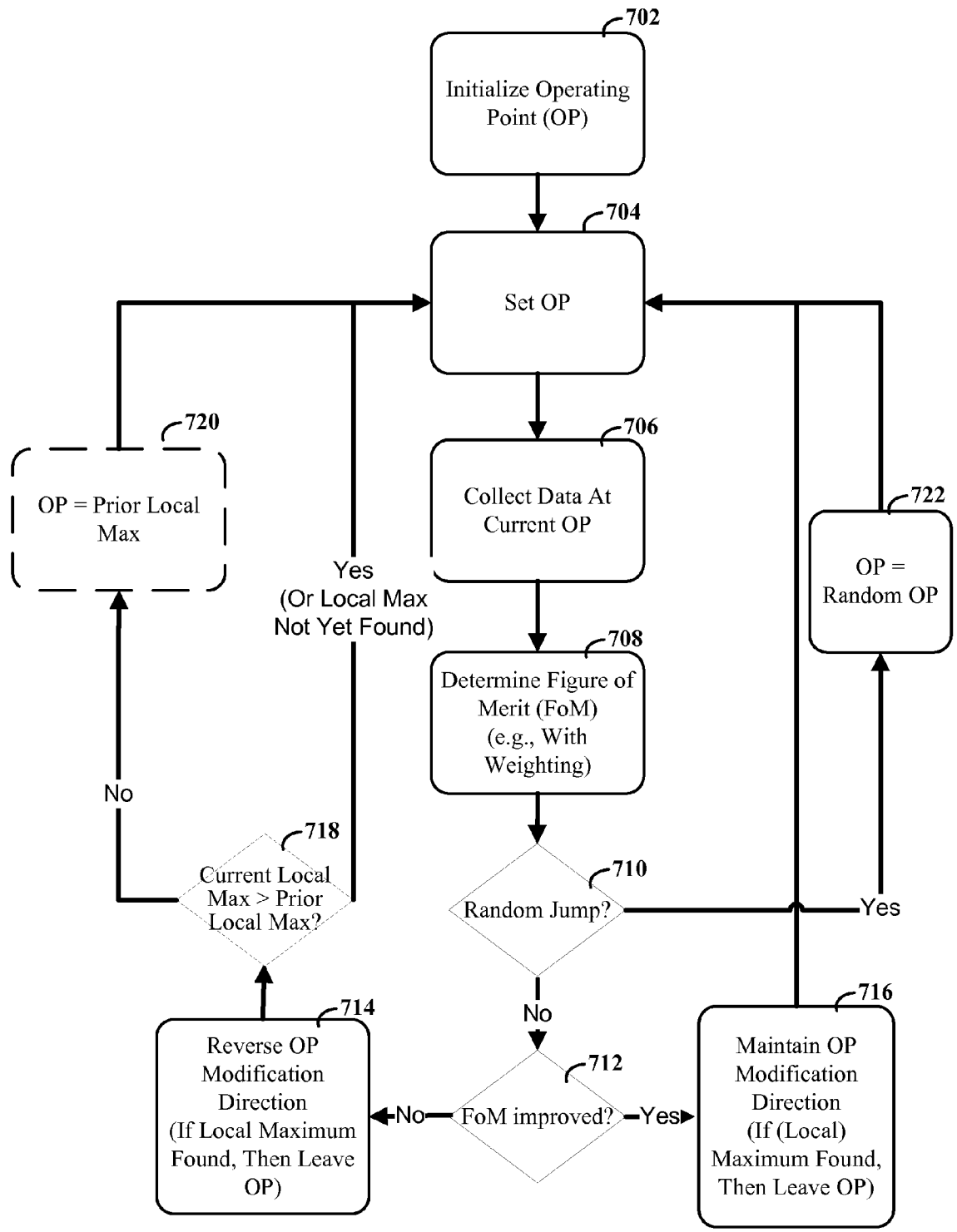
FIG. 7 depicts a flow diagram of a hill climbing algorithm that is designed to avoid getting caught in local maximums, consistent with embodiments of the present disclosure.

FIG. 7 depicts a flow diagram of a hill climbing algorithm that is designed to avoid getting caught in local maximums, consistent with embodiments of the present disclosure. Blocks 702-708 and 712-716 function in a manner that is consistent with the descriptions for similar blocks found in FIG. 6. At block 710, the algorithm can determine whether or not to take a random jump to an operating point. This determination can be made periodically, randomly and/or in response to detected parameters of the system. If a random jump is desired, then the algorithm proceeds to block 722, where the operating point is set to a random (or pseudorandom) value.

FIG. 7 also depicts determination step 718, which can assess whether or not a current maximum point is an improvement over a previous maximum point that was reached before the random jump. If not, then the system can return to the previous operating point at block 720.

Various modules and/or other circuit-based building blocks may be implemented to carry out one or more of the operations and activities described herein and/or shown in the figures. In such contexts, a "module" or "block" is a circuit that carries out one or more of these or related operations/activities. For example, in certain of the above-discussed embodiments, one or more modules are discrete logic circuits or programmable logic circuits configured and arranged for implementing these operations/activities, as in the circuit modules shown in the Figures. In certain embodiments, the module or programmable circuit is one or more computer circuits programmed to execute a set (or sets) of instructions and/or configuration data. The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the present disclosure without strictly following the exemplary embodiments and applications illustrated and described herein. For example, the particular hill climbing algorithms can be modified or replaced with other search algorithms. Such modifications do not depart from the true spirit and scope of the present disclosure, including that set forth in the following claims.

What is claimed is:

1. A photovoltaic power generation device comprising:
   a plurality of photovoltaic modules configured and arranged in a series connection to provide a primary current path;
   a secondary current path circuit;
   an output circuit configured and arranged to receive power from the primary current path and the secondary current path circuit;
   one or more current-diversion circuits configured and arranged to provide an adjustable amount of current from respectively corresponding ones of the plurality of photovoltaic modules to the secondary current path circuit; and
   control logic, including circuitry, configured and arranged to adjust an amount of current provided by the current-diversion circuits in response to an algorithm that selectively controls current provided from the plurality of photovoltaic modules to the output circuit by limiting amounts of power lost through the one or more current diversion circuits, while diverting excess current potential that would otherwise remain unused by the plurality of photovoltaic modules, wherein the control logic is configured to selectively control current provided from the plurality of photovoltaic modules to the output circuit and therein avoid interference resulting from adjustments between multiple current-diversion circuits by coordinating different times for adjustments of different current-diversion circuits.

2. The device of claim 1, wherein the algorithm favors providing current through the primary current path over current through the secondary current path circuit, and wherein the control logic is further configured and arranged to adjust the amount of current provided by the current-diversion circuits in response to the algorithm.

3. The device of claim 2, wherein the algorithm is configured and arranged to adjust the amount of current provided by each of the one or more current-diversion circuits in a direction that increases a total amount of power provided by each of the plurality photovoltaic modules.

4. The device of claim 2, wherein the algorithm is configured and arranged to determine, for each of the plurality photovoltaic modules, an amount of power that is provided through the primary current path and through the secondary current path circuit; to weight the amounts of power to favor more power being provided through the primary current path relative to power being provided through the secondary current path circuit; and to adjust the amount of current provided by the one or more current-diversion circuits in response to a figure of merit determined from the weighted amounts of power.

5. The device of claim 2, wherein the control logic includes multiple circuits that are distributed across the one or more current-diversion circuits and wherein each of the multiple circuits is configured and arranged to apply the algorithm using inputs from a corresponding, local current-diversion circuit.

6. The device of claim 2, wherein the algorithm is a greedy algorithm that is configured and arranged to operate independently for each of the one or more current-diversion circuits.

7. The device of claim 2, wherein the algorithm is configured and arranged to perform a hill climbing routine using an amount of power provided by a corresponding and respective photovoltaic cell to calculate a figure of merit.

8. The device of claim 7, wherein the algorithm is configured and arranged to avoid local maximums for the figure of merit by at least one of restarts of the hill climbing routine at different locations, changes to a step size for the hill climbing routine, and detecting that the figure of merit is below a calculated threshold value.

9. The device of claim 2, wherein the control logic is configured and arranged to remove or bypass, in response to an overall current provided from the photovoltaic module being less than a threshold value, a selected photovoltaic module from the primary current path.

10. The device of claim 2, wherein the algorithm is responsive to maximum power point tracking for the series connection of the plurality photovoltaic modules.

11. The device of claim 2, wherein the algorithm further controls the amount of current provided by the current-diversion circuits in response to a desired voltage level across the series connection of the plurality photovoltaic modules.

12. The device of claim 1, wherein the secondary current path circuit includes a voltage bus connected to both ends of the series connection of photovoltaic modules.

13. The device of claim 1, wherein the one or more current-diversion circuits are DC-to-DC converters.

14. The device of claim 13, wherein the one or more current-diversion circuits are configured and arranged to provide galvanic isolation between an input and output of the DC-to-DC converter.

15. The device of claim 1, wherein the one or more current-diversion circuits are flyback converters.

16. The device of claim 1, wherein the one or more current-diversion circuits are diagonal half-bridge flyback converters.

17. The device of claim 1, further including a primary inverter circuit configured and arranged to convert power received from both the primary current path and the secondary current path circuit to alternating current (AC).

18. The device of claim 1, further including additional photovoltaic modules configured and arranged in series to provide the primary current path, wherein the additional photovoltaic modules do not have corresponding and respective current-diversion circuits.

19. A photovoltaic power generation device comprising:
a plurality of photovoltaic modules configured and arranged in a series connection to provide a primary current path;
a secondary current path circuit;
an output circuit configured and arranged to receive power from the primary current path and the secondary current path circuit;
one or more current-diversion circuits configured and arranged to provide an adjustable amount of current from respectively corresponding ones of the plurality of photovoltaic modules to the secondary current path circuit; and
control logic, including circuitry, configured and arranged to adjust an amount of current provided by the current-diversion circuits in response to an algorithm that favors providing current through the primary current path over current through the secondary current path circuit, and configured and arranged to avoid interference resulting from adjustments between multiple current-diversion circuits by randomizing times at which adjustments are made to different current-diversion circuits.

20. A photovoltaic power generation device comprising:
a plurality of photovoltaic modules configured and arranged in a series connection to provide a primary current path;
a secondary current path circuit;
an output circuit configured and arranged to receive power from the primary current path and the secondary current path circuit;
one or more current-diversion circuits configured and arranged to provide an adjustable amount of current from respectively corresponding ones of the plurality of photovoltaic modules to the secondary current path circuit; and
control logic, including circuitry, configured and arranged to adjust an amount of current provided by the current-diversion circuits in response to an algorithm that favors providing current through the primary current path over current through the secondary current path circuit, and configured and arranged to avoid interference resulting from adjustments between multiple current-diversion circuits by coordinating different times for adjustments of different current-diversion circuits.

21. A photovoltaic power generation device comprising:
a plurality of photovoltaic modules configured and arranged in a series connection to provide a primary current path;
a secondary current path circuit;
an output circuit configured and arranged to receive power from the primary current path and the secondary current path circuit;
one or more current-diversion circuits configured and arranged to provide an adjustable amount of current from respectively corresponding ones of the plurality of photovoltaic modules to the secondary current path circuit; and
a primary inverter circuit configured and arranged to convert power received from both the primary current path and the secondary current path circuit to alternating current (AC) and configured and arranged to perform maximum power point tracking by making adjustments to power providing capabilities of the primary inverter circuit, the primary inverter circuit being further configured and arranged to perform the adjustments to its power providing capabilities according to a first timescale that is substantially different from a second timescale that is used to adjust the power provided by the current-diversion circuits.

22. A photovoltaic power generation device comprising:
a plurality of photovoltaic modules configured and arranged in a series connection to provide a primary current path;
a secondary current path circuit;
an output circuit configured and arranged to receive power from the primary current path and the secondary current path circuit; and
one or more current-diversion circuits configured and arranged to provide an adjustable amount of current from respectively corresponding ones of the plurality of photovoltaic modules to the secondary current path circuit, wherein the output circuit is configured and arranged to provide a separate output path for power from each of the primary current path and the secondary current path circuit.

23. A device comprising:
a photovoltaic string configured and arranged to generate a photovoltaic string voltage across two output nodes, the photovoltaic string including:
a plurality of photovoltaic modules connected in series between two output nodes and configured and arranged to provide power as a function of a current generated by the plurality of photovoltaic modules, each particular photovoltaic module of the plurality of photovoltaic modules including
a photovoltaic unit including power providing nodes connected in series between the two output nodes, the photovoltaic unit configured and arranged to generate, in response to incident light, both photovoltaic unit voltage and an electrical current between the power providing nodes, and
a power conversion unit configured and arranged to provide a portion of the electrical current between the power providing nodes by performing a DC-to-DC conversion from the photovoltaic unit voltage to an output voltage, wherein the power conversion unit is configured and arranged to provide the portion of the electrical current between the power providing nodes to an output other than the two output nodes of the photovoltaic string, and in the form of alternating current (AC) power.

24. The device of claim 23, further including control logic configured and arranged to control an amount of power provided through each conversion unit by applying an algorithm that favors power provided through the photovoltaic modules connected in series over power provided through each conversion unit.

25. The device of claim 23, wherein the power conversion unit is configured and arranged to provide the portion of the electrical current between the power providing nodes to the two output nodes of the photovoltaic string.

26. The device of claim 23, further including circuitry configured and arranged to respond to an indication that at least one of the photovoltaic modules is underperforming, by removing said at least one of the underperforming photovoltaic modules and increasing the amount of current through the primary current path for remaining ones of the photovoltaic modules.

27. The device of claim 23, wherein the power conversion unit is configured and arranged to provide a portion of electrical current from more than one photovoltaic modules of the plurality of photovoltaic modules.

28. A method of operating a photovoltaic power generation device, the method comprising:
arranging photovoltaic modules in a series connection to provide a primary current path; and
diverting current through one or more current-diversion circuits to an output circuit of the photovoltaic power generation device, each current-diversion circuit being configured and arranged to provide a secondary current path circuit and the output circuit being configured and arranged to provide a separate output path for power from each of the primary current path and the secondary current path circuit.

29. The method of claim 28, further including a step of detecting an amount of current provided by each of the one or more current-diversion circuits, each current-diversion circuit providing the secondary current path circuit from a corresponding and respective one of the photovoltaic modules.

30. The method of claim 29, further including a step of applying an algorithm that favors current through the primary path over current through the secondary current path circuit to determine adjustments to the amount of current provided by each of the one or more current-diversion circuits.

* * * * *